United States Patent
von Hammel et al.

(10) Patent No.: US 7,162,341 B2
(45) Date of Patent: Jan. 9, 2007

(54) MOTOR-DRIVEN POWER STEERING UNIT

(75) Inventors: Klaus von Hammel, Stuttgart (DE); Harwin Niessen, Kirchheim u. Teck (DE)

(73) Assignee: ThyssenKrupp Presta SteerTec GmbH (DE)

( * ) Notice: Subject to any disclaimer, the term of this patent is extended or adjusted under 35 U.S.C. 154(b) by 478 days.

(21) Appl. No.: 10/474,707

(22) PCT Filed: Apr. 8, 2002

(86) PCT No.: PCT/EP02/03884

§ 371 (c)(1),
(2), (4) Date: Nov. 4, 2003

(87) PCT Pub. No.: WO02/081288

PCT Pub. Date: Oct. 17, 2002

(65) Prior Publication Data

US 2004/0098180 A1    May 20, 2004

(30) Foreign Application Priority Data

Apr. 9, 2001  (DE) ................. 101 17 634

(51) Int. Cl.
 *B62D 5/04* (2006.01)
(52) U.S. Cl. .................... 701/41; 180/443
(58) Field of Classification Search ........... 701/41; 180/410, 412, 413, 415, 421, 422, 443, 446
See application file for complete search history.

(56) References Cited

U.S. PATENT DOCUMENTS

| | | | | |
|---|---|---|---|---|
| 4,753,308 A | * | 6/1988 | Noto et al. ................ | 180/446 |
| 5,097,918 A | * | 3/1992 | Daido et al. ............... | 180/446 |
| 5,878,360 A | * | 3/1999 | Nishino et al. ............. | 701/41 |
| 6,736,236 B1 | * | 5/2004 | Kurishige et al. .......... | 180/446 |
| 6,854,559 B1 | * | 2/2005 | Kurishige et al. .......... | 180/446 |
| 2005/0061577 A1 | * | 3/2005 | Shimizu et al. ............ | 180/446 |
| 2005/0236223 A1 | * | 10/2005 | Yokota ....................... | 180/446 |

FOREIGN PATENT DOCUMENTS

| | | |
|---|---|---|
| DE | 197 13 576 | 10/1998 |
| EP | 1167158 | 1/2002 |
| WO | WO 01/20412 | 3/2001 |

\* cited by examiner

*Primary Examiner*—Gary Chin
(74) *Attorney, Agent, or Firm*—Robert W Becker & Associates; Robert W Becker

(57) ABSTRACT

A motor-driven power steering unit comprising an electric motor for producing an auxiliary steering force in a steering system coupling a steering wheel to two wheels of a vehicle. The steering system provides assistance, based on steering information, to a rotation of the steering wheel by control of an electric current fed to the electric motor. A steering angle detection device is provided, wherein the steering system regulates the assistance as a function of a steering angle detected by the detection device. The assistance, or current, is reduced after a pre-set or pre-definable angle is reached or exceeded prior to reaching a respective end position. The reduction of the assistance or current is cancelled as soon as signs of steering force and the steering angel no longer coincide.

13 Claims, 3 Drawing Sheets

MOTOR-DRIVEN POWER STEERING UNIT

BACKGROUND OF THE INVENTION

The present invention relates to a motor-driven power steering unit with an electric motor for producing an auxiliary steering force in a steering system that couples a steering handle to the wheels of a vehicle, whereby the power steering unit assists the rotation of the steering wheel by controlling an electric current fed to the electric motor based on steering information comprising a steering angle detection device.

A generic motor-driven power steering unit is known from DE 38 21 789. This power steering unit comprises a steering force protection device for detecting the steering force produced in the steering system as well as an overload protection device to reduce the electric current fed to the electric motor. On the basis of the steering force detected, which is measured, for example, on the torsion bar of the steering system, the support is reduced by means of the overload protection device if the steering force detected exceeds a pre-determined angle. In addition, DE 38 21 789 discloses a generic power steering unit, in which additionally the steering speed is measured and this variable is also considered in the computation or reduction of the support. With this embodiment, the support is only reduced if, on the one hand, the hand force level is exceeded and, on the other hand, the steering speed has not exceeded a certain value. The power steering units known from DE 38 21 789 have the disadvantage that the driving feel at the end stop is determined by the rotational rigidity of the torsion bar of the steering system and cannot be influenced or regulated by controlling the power steering unit.

Object of the present invention is to create a power steering unit, in which the driving feel within range of the left and right end stop can be influenced in a pre-determinable way i.e. by a corresponding reduction of the support.

SUMMARY OF THE INVENTION

This object is achieved according to the invention in each case by means of a motor-driven power steering unit that comprises an electric motor for producing an auxiliary steering force in a steering system that couples a steering wheel two wheels of a vehicle, wherein the power steering unit provides assistance, based on steering information, to a rotation of the steering wheel by a control of an electric current that is fed to the electric motor, and also comprises a steering angle detection device, and also comprises a steering angle detection device, wherein the power steering unit regulates the assistance as a function of a detected steering angle, wherein the assistance, or current, is reduced after a preset or pre-definable angle is reached or exceeded prior to reaching a respective end position, and wherein such reduction of the assistance or current is cancelled as soon as the signs of steering force and steering angle no longer coincide.

The power steering unit according to the invention is advantageously characterized in that use of steering angle information already available in any modern steering system can be made. Advantageously, the support or the current to be supplied, which has been detected beforehand by the motor control, can already be reduced before the respective end stop is reached. The extent of the reduction in this case advantageously depends on the steering angle, so that the support can be reduced more and more the nearer the respective end stop is reached. Advantageously, the reduction can result, for example, due to the fact that the value detected by the motor control for the current to be supplied is multiplied by a proportionality factor a and then the value is transmitted to the controllable power source, which then regulates the current to be supplied. The function a=f (steering angle) in this case can be selected at will. If this support is to be prevented from being totally reduced, that is to say to zero, it is advantageous to specify a lower minimum value for the proportionality factor.

It is also advantageous that the reduction of the support only becomes active if the vehicle has not yet exceeded a certain speed. Thereby, erroneous detection of the steering angle only having an effect at low speeds is prevented and no disturbance arises at higher speeds through inadvertent influence of the support.

Likewise the range, within which the support is to be reduced, can be freely specified by pre-setting limit angles independently of technical parameters.

So that the steered vehicle wheels can be turned with the full support out of one of the two end positions to the central position, the power steering units according to the invention possess a function, which query the signs of the hand force and the steering angle. In this case, depending on the sign convention for each end position two cases are differentiated. If both variables have the same sign, which means that the steering force is directed in such a manner that attempt is made to move the wheels toward the end position, the support is reduced, if the aforementioned limit angle is exceeded. When the wheels are steered out of the end position toward the central position on the other hand, the signs of the variables are different. In this case, the maximum or optimum support is to be made available to the driver. The proportionality factor in this case therefore is set to one, so that the value computed by the motor control for the current to be supplied is passed onto the variable power source.

Naturally, the invention is not limited to the fact that the value of the current to be supplied is only multiplied and handed over to the motor control or the controllable power source by means of the proportionality factor. It is also possible that the support force computed by the steering system is multiplied with the proportionality factor and then the product is handed over to the motor control and/or another control or regulating unit.

BRIEF DESCRIPTION OF THE DRAWINGS

The operational principle of the invention is described in detail below on the basis of drawings, wherein.

DESCRIPTION OF PREFERRED EMBODIMENTS

Figure 1:
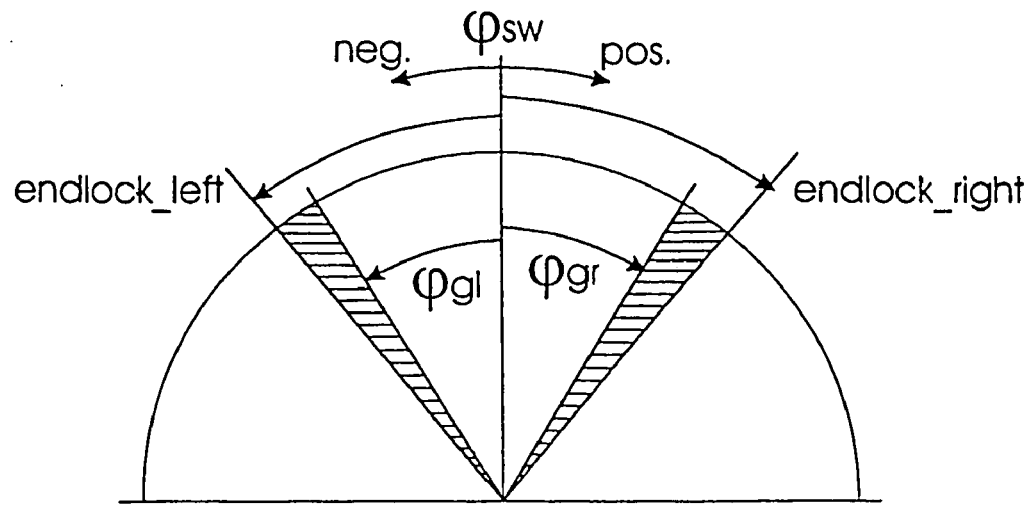
FIG. 1 shows angle ranges, in which the support is reduced, if the vehicle speed has not exceeded a certain value.

FIG. 1 serves to explain the variables relevant to the power steering unit according to the invention. In this case, "endlock_right" designates the angle, at which the steering system is positioned in the right mechanical end stop. "endlock_left" designates the angle, at which the steering system is positioned in the left mechanical end stop. The angle $\Phi_{gr}$ is the right limit angle and $\Phi_{gl}$ is the left limit angle. If the steered wheels are rotated in such a manner that the steering angle falls in the hatched area, the support or the current to be supplied is reduced. If optionally the vehicle speed $v_{vehicle}$ is considered, the support or the current to be supplied is only reduced, if the vehicle has not exceeded a certain preset speed. Depending on the sign convention selected, the steering angle $\Phi_{sw}$ is positive, if the steering wheel or the wheels are moved to the right. The steering angle $\Phi_{sw}$ on the other hand is negative, if the steering wheel or the wheels are turned or moves to the left. If the steering wheel and/or the steered vehicle wheels are in the central position, the steering angle $\Phi_{sw}$ is equal to zero.

Figure 2:
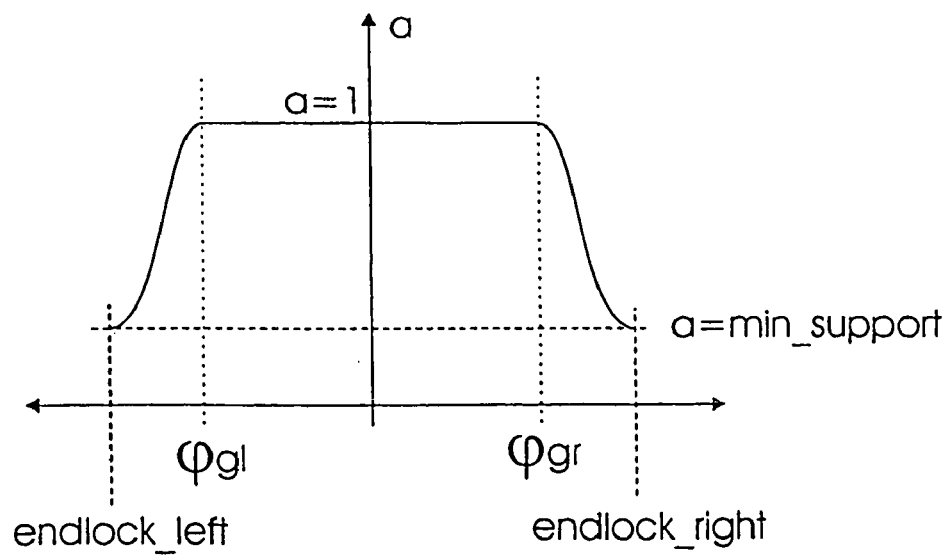
FIG. 2 shows a possible function a=f (steering angle)

FIG. 2 shows a possible functional correlation between the factor a and the steering angle $\Phi_{sw}$. The factor a is equal to one, if the steering angle $\Phi_{sw}$ has not exceeded either of the two limit angles $\Phi_{gr}$ and $\Phi_{gl}$. On the other hand, as soon as the steering angle $\Phi_{sw}$ has exceeded one of the two limit angles $\Phi_{gr}$ and $\Phi_{gl}$, the factor a becomes less. If necessary, additional query and limitation for the factor a can result. Thus, for example, the value can be limited to a lower limit value min_support, which it reaches with the steering angle $\Phi_{sw}$ equal to endlock_right or endlock_left or beforehand. The functional correlation shown in FIG. 2 is only given by way of example. Naturally, it is possible to preset the curve progression differently depending on need. For example, a linear, quadratic, exponential or logarithmic decrease of the factor a in the angle ranges endlock_left<$\Phi_{sw}$<$\Phi_{gl}$ or $\Phi_{gr}$<$\Phi_{sw}$<endlock_right is conceivable. Thus, any appropriate values for min_support can also be specified.

Figure 3:
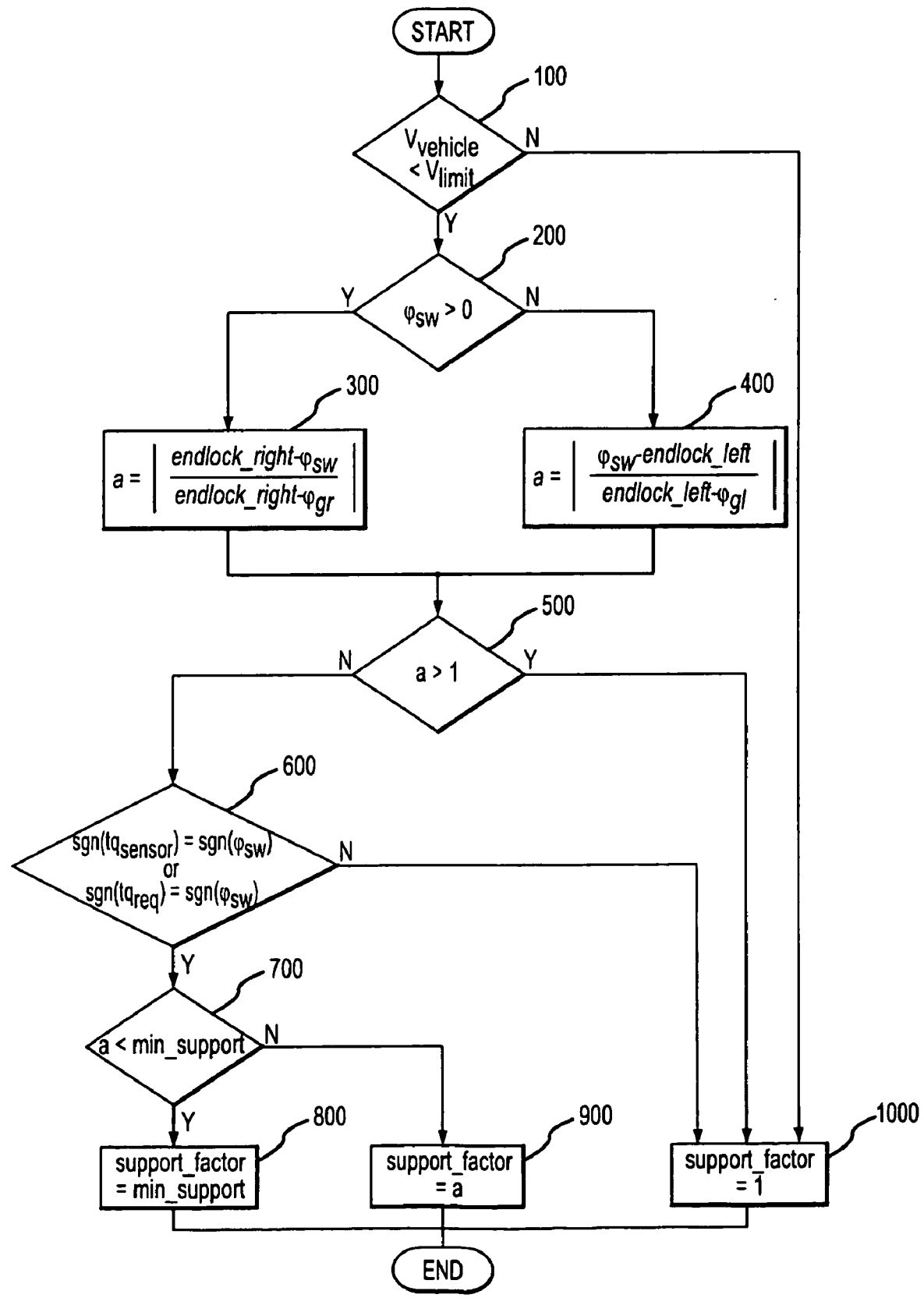
FIG. 3 is a flow chart for a possible process to compute a proportionality factor.

FIG. 3 shows a flow chart for a possible process to implement the power steering units according to the invention. In a first step 100, it is checked whether the vehicle speed has exceeded a certain value $v_{limit}$. If the vehicle is travelling at a speed greater than $v_{limit}$, the proportionality factor support_factor is set in step 1000 equal to one, whereby the computation process is continued to the end, and is afterwards restarted. If the vehicle has not exceeded $v_{limit}$ it goes to step 200, where the sign of the steering angle $\Phi_{sw}$ is checked. If $\Phi_{sw}$ is less than zero, that is to say turned to the left, the factor a is computed by means of the step 400. The angle difference between the end stop angle endlock_left and the steering angle $\Phi_{sw}$ is computed in this case. This difference is divided by the angle difference of endlock_left minus $\Phi_{gl}$. Since the angle difference endlock_left minus the limit angle $\Phi_{gl}$ is a constant, which indicates an angle range, it can also be divided by this previously computed and stored angle range value. If the last mentioned angle difference is positive, the absolute value of a does not need to be computed. Accordingly, the factor a is computed in step 300, if the steering angle $\Phi_{sw}$ is greater than zero. The factor a is a function of the steering angle $\Phi_{sw}$. Depending on the preset limit angle $\Phi_{gl}$ or $\Phi_{gr}$, the value of the factor a, in the case of a steering angle $\Phi_{sw}$ becoming lesser or greater, will fall short of a certain pre-definable value. In step 500, it is checked whether the value previously computed in steps 300 and 400 is greater than one. If, in the case of the process shown in FIG. 3, the value of a is greater than one, the proportionality factor support_factor is set equal to one and the process is ended or the value of the proportionality factor support_factor is passed on for further computation of the support. If the value of the factor a is less or equal to one, the signs are checked in step 600. In this case, alternatively either the direction or the sign of the hand force $tq_{sensor}$ can be compared with the sign of the steering angle. Or the direction or the sign of the support or the controlling signal $tq_{reg}$ already detected by the steering system or controller is compared with the sign of the steering angle. If the signs or directions do not coincide, it goes to step 1000 and the proportionality factor support_factor is set equal to one. If the signs of the values are unequal, the case results that attempt is made to move the wheels or the steering wheel towards the central position. If the signs are identical, attempt is made to move the wheels or the steering wheel towards the end position. In this case, it is checked in step 700 whether the value of the factor a is less than the minimum permissible support factor min_support. If a<min_support, it goes to step 800 and the proportionality factor support_factor is set to equal min_support. If a>=min_support, it goes to step 900 and the proportionality factor support_factor is set to equal a. After steps 800 and 900 are completed, the computation process is concluded and the computation of a new proportionality factor support_factor can be started.

Figure 4:
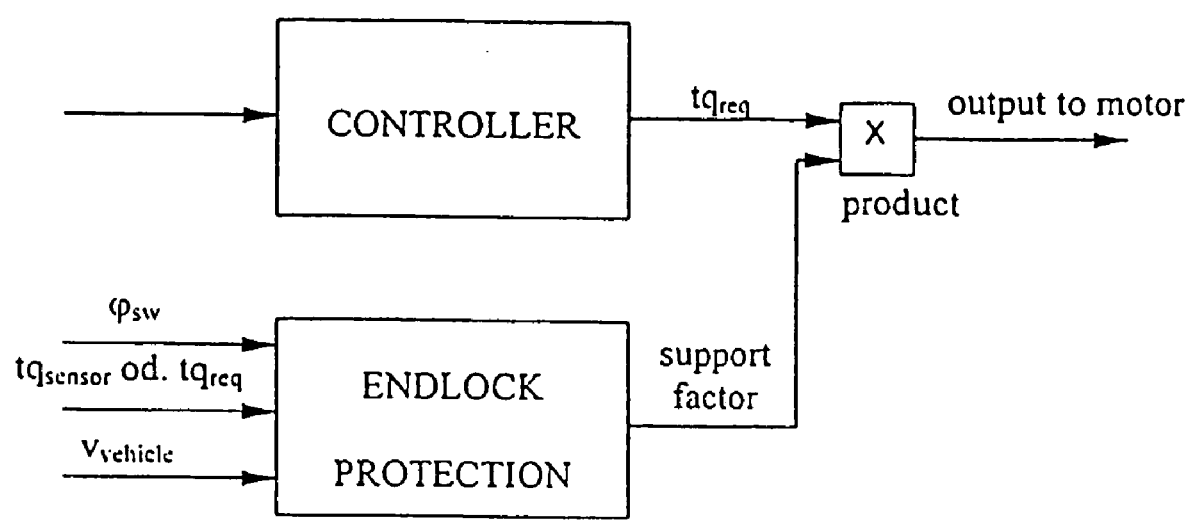
FIG. 4 is a block diagram for a possible arrangement of the steering angle dependent-reduction unit or "endlock protection" unit in the steering system.

FIG. 4 shows a block diagram for a possible arrangement of the steering angle dependent-reduction unit or "endlock protection" unit in the steering system. The controller produces a controlling signal $tq_{reg}$, which is multiplied with the proportionality factor support_factor. The product of the multiplication is then fed to the motor control of the electric motor, which generates the support. The proportionality factor support_factor is computed by means of the "endlock protection" unit, which for example uses the process described in FIG. 3. Only absolutely essential input variable for the "endlock protection" unit is the steering angle $\Phi_{sw}$. Optionally, the vehicle speed $v_{vehicle}$ and the hand force detected or the size of the adjusting signal $tq_{reg}$ can also be used to determine the proportionality factor support_factor.

The specification incorporates by reference the disclosure of German priority document 101 17 634.1 filed Apr. 9, 2001 and PCT/EP02/03884 filed Apr. 8, 2002.

The present invention is, of course, in no way restricted to the specific disclosure of the specification and drawings, but also encompasses any modifications within the scope of the appended claims.

The invention claimed is:

1. A motor-driven power steering unit, comprising:
   an electric motor for producing an auxiliary steering force in a steering system that couples a steering wheel to two wheels of a vehicle, wherein said steering system provides assistance, based on steering information, to a rotation of said steering wheel by a control of an electric current that is fed to said electric motor; and
   a steering angle detection device, wherein said steering system regulates said assistance as a function of a steering angle detected by said steering angle detection device, wherein said assistance, or current, is reduced after a preset or pre-definable angle is reached or exceeded prior to reaching a respective end position, and wherein the reduction of said assistance or current is cancelled as soon as signs of steering force and the steering angle no longer coincide.

2. A motor-driven power steering unit according to claim 1, wherein said power steering unit has an overload protect on device to reduce the electric current fed to the electric motor.

3. A motor-driven power steering unit according to claim 1, wherein said assistance or electric current is reduced in angle ranges prior to reaching respective end positions of steered vehicle wheels.

4. A motor-driven power steering unit according to claim 1, wherein said assistance is reduced in a manner that steered wheels or said steering wheel or steering linkage can at maximum only reach the end positions with a pre-set maximum speed or force, or with said pre-set maximum speed and said force.

5. A motor-driven power steering unit according to claim 1, wherein said assistance is reduced only if the vehicle has not exceeded a certain speed.

6. A motor-driven power steering unit according to claim 1, wherein said assistance is continually reduced more and more after a certain pre-definable or pre-set angle $\Phi_{gr}$ or $\Phi_{gl}$ is reached until a respective end position is reached.

7. A motor-driven power steering unit according to claim 6, wherein said reduction increases linearly, exponentially, quadratically or corresponding to an angle dependent-function.

8. A motor-driven power steering unit according to claim 1, wherein said assistance computed by said steering system, of the value of the electric current to be supplied, is multiplied with a proportionality factor "support$_{13}$ factor", and the resulting product is fed to said electric motor.

9. A motor-driven power steering unit according to claim 8, wherein the "support_factor" is computed by the steps of:

checking in a first process step whether an actual vehicle speed $v_{vehicle}$ has exceeded a certain speed $v_{limit}$, and if $v_{vehicle} \geq v_{limit}$, setting the proportionality factor "support_factor" to equal 1 (one), and the process ends, or if $v_{vehicle} < v_{limit}$, continuing the computation of the proportionality factor "support$_{\_factor}$".

10. A motor-driven power steering unit according to claim 9, wherein if the condition $v_{vehicle} \geq v_{limit}$ is present, checking in a subsequent process step whether the steering angle is positive or negative, whereby a factor a is then computed subsequently for the respective angle ranges, whereby $$a = \left| \frac{\varphi_{sw} - \text{endlock\_left}}{\text{endlock\_left} - \varphi_{gl}} \right|$$

if said steering wheel is turned from a central position to the left, and whereby $$a = \left| \frac{\text{endlock\_right} - \varphi_{sw}}{\text{endlock\_right} - \varphi_{gl}} \right|$$

if said steering wheel is turned from a central position to the right, whereby endlock_right is the right stop angle, endlock_left is the left stop angle, and $\Phi_{sw}$ is the actual steering wheel angle.

11. A motor-driven power steering unit according to claim 10, wherein for values of the factor a which are greater than the value one, the proportionality factor support_factor is set equal to one and the computation is ended.

12. A motor-driven power steering unit according to claim 10, wherein the proportionality factor support_factor is set equal to the factor a if the value of the factor a is greater than or equal to a pre-set minimum value min_support and less than or equal to one, and wherein the proportionality factor support_factor is set equal to the minimum value min_support if the factor a is less than the minimum value min_support.

13. A motor-driven power steering unit according to claim 10, wherein the proportionality factor support_factor is set equal to one as soon as the signs of the steering force and the steering angle no longer coincide.

\* \* \* \* \*